United States Patent
McKeirnan, Jr.

(10) Patent No.: US 7,371,011 B2
(45) Date of Patent: May 13, 2008

(54) TURBOCHARGER SHAFT BEARING SYSTEM

(76) Inventor: Robert D. McKeirnan, Jr., 1086 Twinfoot Ct., Westlake Village, CA (US) 91361

( * ) Notice: Subject to any disclaimer, the term of this patent is extended or adjusted under 35 U.S.C. 154(b) by 170 days.

(21) Appl. No.: 11/202,448

(22) Filed: Aug. 11, 2005

(65) Prior Publication Data

US 2007/0036477 A1     Feb. 15, 2007

(51) Int. Cl.
F16C 25/06 (2006.01)
F04B 17/00 (2006.01)

(52) U.S. Cl. ............. 384/517; 384/504; 417/407
(58) Field of Classification Search ........ 384/499–504, 384/517–520, 556, 563; 417/407
See application file for complete search history.

(56) References Cited

U.S. PATENT DOCUMENTS

| | | | | |
|---|---|---|---|---|
| 3,574,424 A | * | 4/1971 | Hegemeister | ............... 384/517 |
| 3,890,780 A | * | 6/1975 | Hegemeister et al. | ....... 417/407 |
| 4,676,667 A | * | 6/1987 | Komatsu et al. | ............ 384/517 |
| 4,961,654 A | * | 10/1990 | Pangburn et al. | ........... 384/517 |
| 5,388,917 A | * | 2/1995 | Hibi et al. | .................. 384/517 |
| 6,739,845 B2 | | 5/2004 | Woolenweber | |
| 6,877,901 B2 | | 4/2005 | Wollenweber | |
| 2004/0200215 A1 | | 10/2004 | Woollenweber et al. | |

* cited by examiner

*Primary Examiner*—Thomas T Hannon
(74) *Attorney, Agent, or Firm*—Kelly Lowry & Kelley, LLP; Stuart O. Lowry

(57) ABSTRACT

An improved bearing system is provided for use in high speed rotating machinery such as a turbocharger, wherein a turbocharger shaft is rotatably supported at opposite ends by a pair of angular contact bearings subjected to a predetermined and substantially constant thrust pre-load. The angular contact bearings are carried respectively within a pair of generally cylindrical bearing sleeves which cooperatively define an axially split bearing carrier mounted within a turbocharger housing. A spring reacts between these bearing sleeves for applying a substantially constant axial thrust pre-load transmitted by the bearing sleeves to the angular contact bearings. The mechanical spring thrust pre-load may be supplemented by an hydraulic axial thrust load attributable to oil circulated through the split bearing carrier.

18 Claims, 3 Drawing Sheets

TURBOCHARGER SHAFT BEARING SYSTEM

BACKGROUND OF THE INVENTION

This invention relates generally to improvements in bearing systems for use in high speed rotating machinery or turbomachines, particularly such as a turbocharger for supplying charge air at elevated pressure to an internal combustion engine. More particularly, this invention relates to an improved turbomachine bearing system of the type having a high speed rotary shaft supported by a pair of angular contact bearings, wherein the angular contact bearings are subjected to a substantially constant axial thrust pre-load.

Turbochargers are well known in the art for use in supplying charge air under pressure to an internal combustion engine for the purpose of increasing engine performance. Such turbochargers generally comprise a turbine wheel and a compressor wheel or impeller mounted on a common shaft which is supported by suitable bearings for high speed rotational operation. The turbine wheel is positioned within a turbine housing shaped for flow-through passage of engine exhaust gases which rotatably drive the turbine wheel at relatively high speed. The thus-driven shaft and associated bearings are typically mounted within a so-called center housing disposed between the turbine housing and a compressor housing having the compressor impeller therein. Accordingly, the exhaust-gas driven turbine wheel rotatably drives the compressor wheel which draws in and compresses ambient air to provide pressurized charge air to the associated internal combustion engine.

Significant design and development effort has focused upon the turbocharger shaft bearings in attempts to provide reduced bearing friction losses in combination with smooth and substantially vibration-free shaft rotation in a bearing configuration that is compatible with the relatively high speed and temperature transient conditions of a turbocharger operating environment. In this regard, numerous configurations have been proposed for oil-lubricated sleeve-type journal bearings such as floating bushings mounted generally at opposite ends of the turbocharger shaft at locations generally and respectively adjacent the turbine and compressor housings. Such sleeve-type bearing systems have additionally required a separate thrust bearing typically in the form of a radial collar on the rotating turbocharger shaft to sustain axial loads during operation. However, such collar-style rotating thrust bearings have been associated with substantial friction losses.

In recent years, improved turbocharger bearing systems using improved anti-friction ball bearings have been proposed. In this regard, angular contact ball bearings have been suggested wherein a pair of angular contact ball bearing units is provided for supporting opposite ends of the high speed turbocharger shaft. See, for example, U.S. Pat. Nos. 6,739,845 and 6,877,901, and U.S. Publication US 2004/0200215, all of which are incorporated by reference herein. In such designs, the turbine-end and compressor-end ball bearing units are mounted within a common, generally cylindrical bearing carrier, and are respectively designed to carry thrust loads acting in opposite axial directions, namely, an inboard direction (i.e., with the thrust loads acting axially toward each other). Accordingly, the pair of angular contact bearing units provide both rotary and thrust bearing functions. At least one of the angular contact ball bearing units is further associated with a spring or tolerance ring for applying an axial outboard-directed thrust pre-load force to the associated bearing unit outer race, thereby accommodating at least some axial migration of the outer race relative to the bearing carrier in response to thermal transients and the like.

The present invention relates to an improved turbocharger shaft bearing system of the above-described type including angular contact ball bearing units, wherein these ball bearing units are mounted within an axially split or two-part bearing carrier in combination with a relatively large, sturdy and reliable thrust spring for applying a substantially constant and uniform, axially outboard-directed thrust pre-load force to both ball bearing units.

SUMMARY OF THE INVENTION

In accordance with the invention, an improved shaft bearing system is provided for use in high speed rotating machinery such as a turbocharger for supplying compressed charge air to an internal combustion engine or the like. Such turbocharger generally comprises an exhaust gas driven turbine wheel and a compressor wheel or impeller positioned respectively within turbine and compressor housings, and carried at opposite ends of a common turbocharger shaft which is rotatably supported within an intermediate-positioned center housing. The improved shaft bearing system comprises a pair of angular contact ball bearings or bearing units respectively supporting opposite ends of the turbocharger shaft within the center housing. These angular contact ball bearing units are associated with means for applying a predetermined and substantially constant axially outboard-directed thrust pre-load.

In a preferred form, the angular contact bearing units each comprise a complement of bearing balls carried radially between inner and outer race rings. The bearing units are installed onto the turbocharger shaft with the inner race rings rotatable with the shaft, and with the outer race rings seated respectively within a pair of generally cylindrical bearing sleeves which cooperatively define a two-part axially split bearing carrier. One of these bearing sleeves, such as the compressor-end sleeve, further includes a radially enlarged thrust flange interposed axially between thrust faces formed respectively on the center and compressor housings for axially fixing the position of said one bearing sleeve. A cylindrical and elongated tube-shaped bearing spacer is carried on the shaft axially between the bearing units, in thrust engagement with the inner race rings thereof, to fix the axial spacing therebetween and further to retain the inner race rings in thrust engagement respectively with a turbine-end shaft thrust shoulder and a compressor-end spacer collar mounted on the shaft. The angular contact ball bearing units are constructed to carry thrust loads acting in opposite axial directions, namely, an inboard direction (i.e., with the thrust loads acting axially toward each other).

The thrust pre-load means applies an axially outboard-directed thrust pre-load of predetermined force to each of the pair of bearing sleeves defining the axially split bearing carrier. This thrust means comprises, in the preferred form, a relatively large and sturdy spring member such as an annular or ring-shaped wave spring interposed axially between inboard-facing ends or inboard-facing shoulders defined by the pair of bearing sleeves. In this regard, in the preferred form, the bearing sleeves define concentrically overlapping inboard-end segments slidably interfitted one within the other, with the spring member reacting axially between an inboard-facing step shoulder on one bearing sleeve and an inboard-facing end of the other bearing sleeve.

In addition, the split bearing carrier may further define an oil flow chamber disposed axially between the bearing units, with the inboard-end segments of the bearing sleeves defining at least one oil inflow port for receiving a flow of lubricant into said oil flow chamber. This oil flow beneficially lubricates the bearing units at the split interface between the bearing sleeves, and further provides an axial thrust load local to the split interface from the hydraulic pressure being fed into the turbocharger. Such hydraulic pressure effectively applies an axial thrust load upon the two bearing units, thereby supplementing the mechanical thrust pre-load provided by the spring member.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
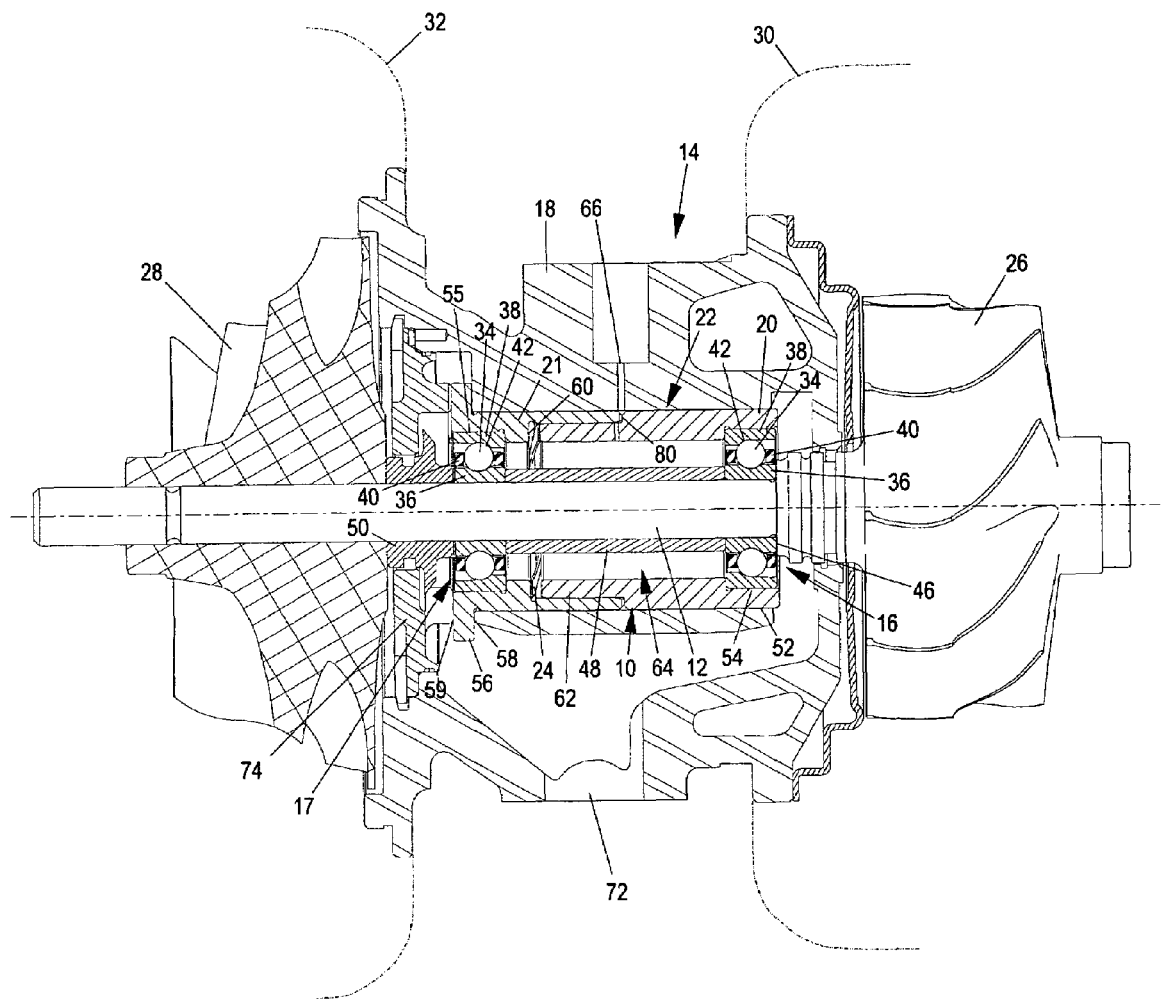
FIG. 1 is vertical sectional view of a portion of a turbocharger taken along a plane through a central axis of rotation thereof, wherein the illustrative turbocharger incorporates an improved bearing system embodying the novel features of the present invention.
Figure 2:
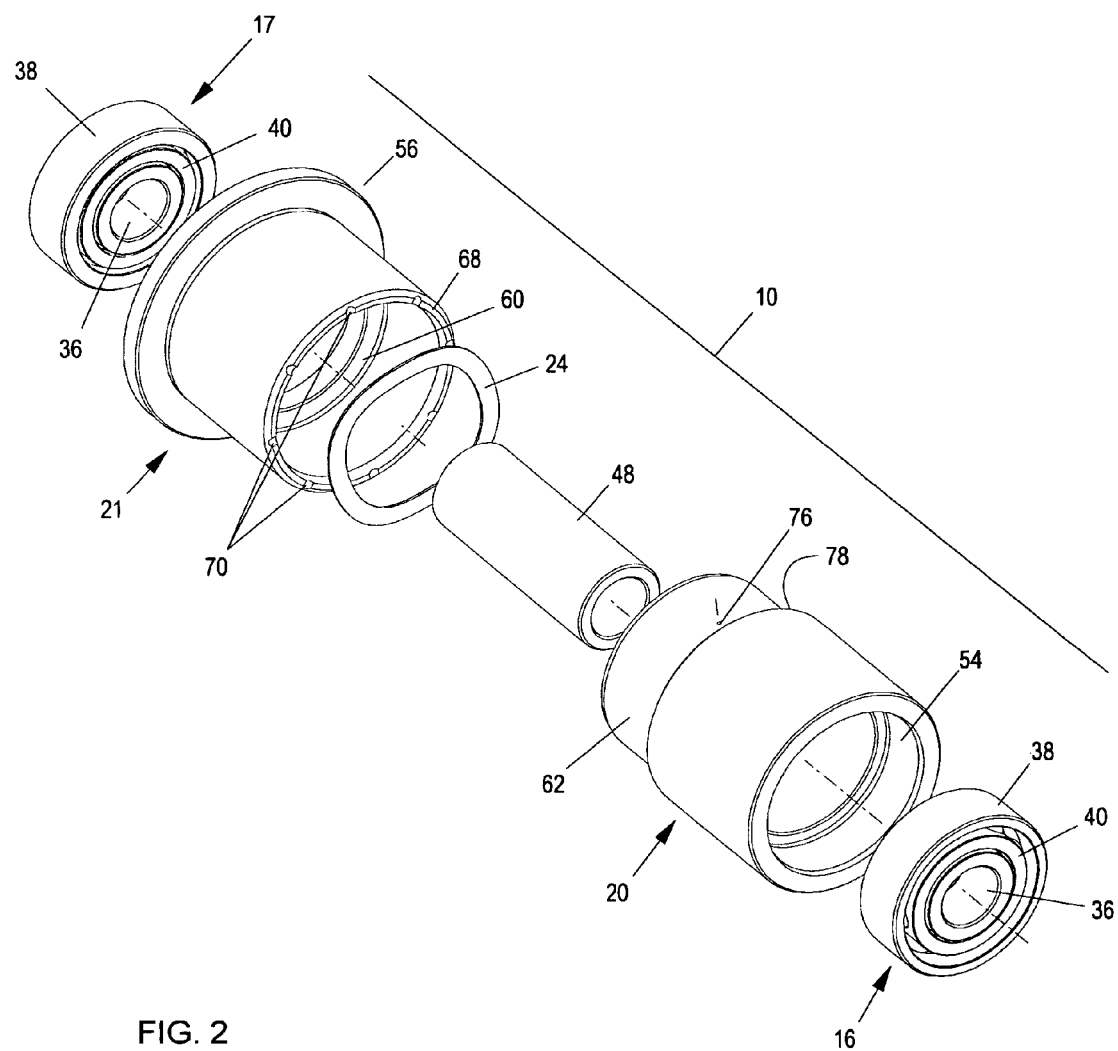
FIG. 2 is an exploded perspective view showing components of the improved bearing system.

As shown in the exemplary drawings, an improved turbomachine shaft bearing system referred to generally in FIGS. 1 and 2 by the reference numeral 10 is provided for rotatably supporting a rotating shaft 12 in high speed machinery such as the illustrative turbocharger 14 (FIG. 1). The shaft bearing system 10 includes a pair of axially spaced angular contact ball bearings or ball bearing units 16 and 17 for rotatably supporting the shaft 12 within a housing such as the illustrative turbocharger center housing 18. In accordance with the invention, the bearing units 16, 17 are carried respectively within a pair of bearing sleeves 20 and 21 defining an axially split bearing carrier 22. Thrust pre-load means such as a mechanical spring member 24 applies a thrust pre-load of predetermined axial and substantially constant axial force to both of the bearing sleeves 20, 21, which in turn transmit the thrust pre-load force to the associated angular contact bearing units 16, 17.

The turbocharger 14 shown in FIG. 1 generally comprises a turbine wheel 26 and a compressor wheel or impeller 28 mounted at opposite ends of the rotary shaft 12. As is known in the art, the turbine wheel 26 is positioned within a turbine housing 30 coupled to an exhaust gas stream from an internal combustion engine (not shown) for rotatably driving the turbine wheel at relatively high speed. The exhaust gas driven turbine wheel thus rotatably drives the supporting shaft 12, which in turn rotatably drives the compressor impeller 28 at the same relatively high rotational speed. The impeller 28 is normally positioned within a compressor housing 32 to draw in and compress ambient air to provide a supply of pressurized charge air to the air intake side of the internal combustion engine, thereby accommodating engine operation at increased performance levels, all in a manner well known to persons skilled in the art.

The turbine and compressor housings 30, 32 are normally mounted onto the center housing 18 which includes a bearing system for rotatably supporting the common shaft 12 during turbocharger operation. In this regard, the shaft bearing system is required to support the shaft 12 throughout a relatively broad range of rotational speeds and transient thrust loads in a relatively hostile exhaust gas and related internal combustion engine operating environment which includes broad-range temperature fluctuations and frequent sustained operation at relatively high temperature. The improved bearing system 10 of the present invention provides a simplified yet reliable bearing arrangement.

More particularly, the improved bearing system 10 utilizes the pair of ball bearing units 16, 17 of so-called angular contact style. In this regard, each of the bearing units 16, 17 includes a complement of relatively low friction or anti-friction bearing balls 34 formed from a suitable material such as metal or ceramic, and constrained radially between an inner race ring 36 and an outer race ring 38. A cage 40 may also be provided between the associated race rings 36, 38 for additionally constraining and retaining the complement of bearing balls 34. As shown best in FIG. 1, the first bearing unit 16 comprises a turbine-end bearing unit, with the outer race ring 38 thereof defining an axially an outboard-presented shoulder 42 whereby the turbine-end bearing unit 16 is adapted to carry a unidirectional thrust load acting in an inboard direction during turbocharger operation. In a similar manner, the second bearing unit 17 comprises a compressor-end bearing unit, with the outer race ring 38 defining an axially outboard-presented shoulder 42 whereby the compressor-end bearing unit 17 is also adapted to carry a unidirectional thrust load acting in an inboard direction during turbocharger operation. Importantly, in this arrangement, the turbine-end and compressor-end bearing units 16, 17 are designed to carry thrust loads acting in opposite axial directions, namely, an axially inboard direction relative to the center housing 18 (i.e., with the thrust loads acting axially toward each other).

These two angular contact style bearing units 16, 17 are mounted onto the turbocharger shaft 12 generally at opposite ends thereof, and within the center housing 18 generally adjacent appropriate housing ends walls through which the shaft 12 extends into the adjacent turbine and compressor housings 30, 32. As shown in the exemplary drawings, the turbine-end bearing unit 16 is installed onto the shaft 12 with close tolerance as by press-fitting the inner race ring 36 thereon with an outboard face of the inner race ring 36 abutting a radially enlarged step shoulder 46 on the shaft 12. An elongated and generally cylindrical or tubular bearing spacer 48 is slidably mounted onto the shaft 12 with one axial end of the spacer 48 abutting an inboard face of the inner race ring 36 of the turbine-end bearing unit 16. The second or compressor-end bearing unit 17 is then installed onto the shaft 12 as by press-fitting the inner race ring 36 thereof into abutting engagement with an opposite end of the bearing spacer 48. Finally, a relatively short cylindrical spacer collar 50 or the like is fitted onto the shaft 12 in a position interposed axially between an axially outboard face of the compressor-end inner race ring 36 and an inboard face of the compressor impeller 28. Accordingly, with this construction, means are provided for essentially defining and retaining the inner race rings 36 of the two bearing units 16, 17 at essentially predetermined positions along the length of the turbocharger shaft 12, i.e., generally at opposite ends of the shaft 12 within the center housing 18.

The split bearing carrier 22 comprises a generally cylindrical structure mounted within a matingly shaped and relatively large bore cavity 52 formed in the center housing 18. The split bearing carrier 22 comprises the pair of generally cylindrical bearing sleeves 20 and 21 mounted slidably within the center housing bore 52. These two bearing sleeves 20 and 21 respectively define shallow counter bores 54 and 55 formed in the outboard ends thereof for respectively receiving and supporting as by press-fit reception the outer race rings 38 of the two bearing units 16, 17.

As shown in accordance with the preferred form of the invention, the bearing sleeve 20 is mounted within the center housing bore 52 generally at the turbine end thereof, whereas the bearing sleeve 21 is mounted within the bore 52 generally at the compressor end thereof. A radially enlarged thrust flange 56 is formed on one of these bearing sleeves 20, 21, such as at the outboard end of the compressor-end bearing sleeve 21 as shown in FIG. 1, in a position interposed axially between thrust faces 58 and 59 formed respectively on adjacent housing structures, such as on the center housing 18 and a compressor-end seal plate 74 (provided as part of or otherwise carried by the compressor housing), as shown. This thrust flange 56 axially constrains the position of the associated bearing sleeve within the center housing 18. Persons skilled in the art will appreciate that the thrust flange 56 may be formed on either one of the two bearing sleeves 20, 21, and may be interposed axially between associated housing-defined thrust faces.

The two bearing sleeves 20, 21 include inboard-end segments shaped for receiving and supporting, and for engagement by the spring member 24. Specifically, in the embodiment shown, the inboard end segments of the two bearing sleeves 20, 21 are shaped for concentric or coaxial overlap at a position axially between the two associated bearing units 16, 17. FIG. 1 shows the compressor-end bearing sleeve 21 formed with an internal, radially inwardly stepped shoulder 60 having a diametric size for slide-fit reception of a diametrically reduced inboard end segment 62 of the turbine-end bearing sleeve 21. With this construction, the spring member 24 such as a relatively stiff and sturdy wave spring or the like is interposed axially between the shoulder 60 on the bearing sleeve 21 and the inboard end of the reduced diameter segment 62 on the other bearing sleeve 20, resulting an axially outboard-directed thrust pre-load applied equally and oppositely to both bearing sleeves 20, 21. This thrust pre-load is transmitted by the respective bearing sleeves 20, 21 directly to the outer race rings 38 of the associated bearing units 16, 17, thereby axially preloading these bearing units with the same thrust force.

Importantly, this thrust pre-load is predetermined by design of the spring member 24, and is substantially constant throughout a broad range of turbocharger operating conditions. The thrust pre-load opposes normal axially inboard-directed thrust forces encountered during turbocharger operation, and accommodates some relative axial displacement of the turbine-end bearing sleeve 20 and the outer race ring 38 of the associated turbine-end bearing unit 16 according to thermal, other transient operating conditions, and assembly stack-up tolerances within the bearing system 10.

In accordance with a further aspect of the invention, the above-described mechanical spring thrust force pre-load applied to the bearing units 16, 17 may be supplemented during turbocharger operation by a supplemental hydraulic force pre-load. In this regard, the assembled split bearing carrier 22 defines a narrow gap 80 formed cooperatively by an inboard end face 68 of the compressor-end bearing sleeve 21, and a stepped shoulder 78 (FIG. 2) at an outboard or base end of the reduced diameter segment 62 on the other bearing sleeve 20. Hydraulic fluid such as lubricating oil can be admitted to this gap 80 via an oil inlet 66 formed in the center housing 18 at a position in substantial axial alignment with said gap. Thus, oil under pressure entering into the center housing bore 52 through the oil inlet 66 is applied over the inboard end-face areas 78, 68 of the bearing sleeves 20, 21, resulting in a supplemental hydraulic axial thrust load applied to these inboard end-face areas and thus correspondingly applying the supplemental hydraulic axial thrust load to the bearing units 16, 17.

As shown best in FIG. 2, this inboard end face of the bearing sleeve 21 incorporates at least one and preferably multiple small oil inflow ports formed therein and defined by shallow recesses 70. The reduced diameter segment 62 of the bearing sleeve 20 includes at least one and preferably multiple oil feed holes 76. The recesses 70 permit oil flow from the oil inlet 66 through the recesses 70, and further between the slidably interfitted inboard end segments of the bearing sleeves 20, 21 into an elongated annular chamber 64 surrounding the bearing spacer 48 and disposed axially between the bearing units. The oil within the chamber 64 may flow outwardly through the bearing units 16, 17, to lubricate those bearing units prior to collection within a sump 72 of the center housing 18 for recirculation. The size of the gap 80 in combination with the sizes of the recesses 70 and at least one oil feed hole 76 can be selected according to the specific hydraulic oil pressure and flow requirements.

Figure 3:
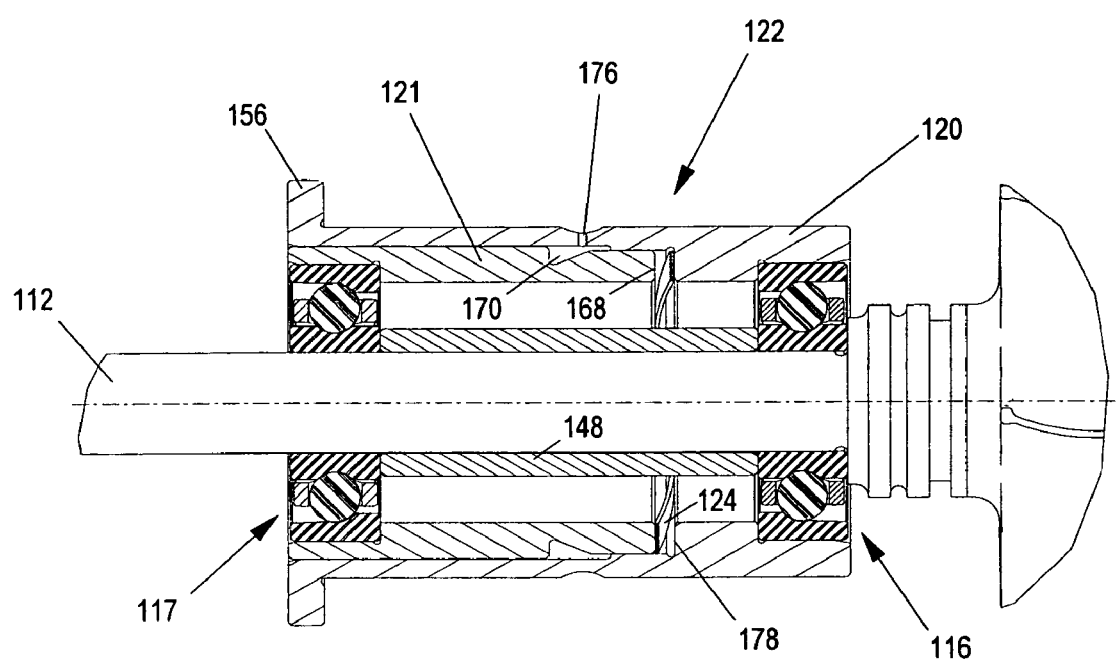
FIG. 3 is an enlarged vertical sectional view similar to a portion of FIG. 1, and illustrating one alternative preferred form of the invention.

FIG. 3 depicts one alternative preferred form of the invention, wherein components corresponding with those shown and described in FIGS. 1 and 2 are identified by common reference numerals increased by 100. As shown, this alternative bearing system includes the pair of bearing units 116, 117 rotatably supporting a rotary shaft 112, with a bearing spacer 148 interposed axially between the two bearing units. The bearing units 116, 117 again comprise angular contact style ball bearings. The bearing units 116, 117 are carried respectively within a pair of bearing sleeves 120, 121 of a split bearing carrier 122.

In the embodiment depicted in FIG. 3, the bearing sleeve 120 associated with the bearing unit 116 extends the entire axial length of the bearing system or assembly, and includes an outwardly radiating thrust flange 156 for axially constraining the bearing system relative to housing components (not shown in FIG. 3). Accordingly, this bearing sleeve 120 comprises an outer bearing sleeve having the other or second bearing sleeve 121 slidably received therein. As shown, the outer bearing sleeve 120 includes a radially inwardly stepped internal shoulder 178 disposed in axially spaced-apart relation with a corresponding inboard end-face 168 of the second or inner bearing sleeve 121. A spring member 124 is axially interposed between these faces 178, 168 for applying the desired axial thrust pre-load in equal and opposite directions to the two bearing sleeves 120, 121.

Oil under pressure may be supplied for supplementing the spring thrust pre-load force, and also for lubricating the bearing components. As shown in FIG. 3, the outer bearing sleeve 120 incorporates at least one and preferably multiple oil feed holes 176 for oil inflow from a housing oil inlet (not shown in FIG. 3). Such oil inflow passes into a notched recess 170 formed circumferentially in the outer diameter surface of the inner bearing sleeve 121, and further from this notched recess 170 through a small clearance between the slidably interfitted bearing sleeves 120, 121 to react axially against the opposed faces 178, 168 to supplement the mechanical thrust pre-load force.

Although two embodiments have been described in detail for purposes of illustration, various further modifications may be made without departing from the scope and spirit of the invention. For example, as one alternative configuration, it will be appreciated that the inner race ring 36 associated with one or both of the bearing units 16, 17 may be formed directly on or integrally with the bearing spacer 48. Similarly, it will be understood that the outer race ring 38 associated with one or both of the bearing units 16, 17 may be formed directly on or integrally with the associated bearing sleeve 20, 21.

Further, the diametric size of the split bearing carrier can be tailored for specific clearance relative to the associated housing bore for accommodating different oil film damping characteristics during operation. Such oil damping effectively provides a shock absorber for protecting the high speed rotor assembly from potentially damaging dynamic impulse loads during operation.

In addition, persons skilled in the art will recognize and appreciate that the invention may be employed in alternative high speed machinery types and configurations including a drive source and a driven load coupled to a common shaft, particularly such as turbo machinery having a gas-driven turbine drive source or the like carried on a rotating shaft for driving a driven load such as a compressor or generator or the like. Other applications of the invention include, but are not limited to micro-turbines, auxiliary power units, and air cycle machines.

Accordingly, no limitation on the invention is intended by way of the foregoing description and accompanying drawings, except as set forth in the appended claims.

What is claimed is:

1. A shaft bearing system for use in a turbomachine having a turbine wheel and a compressor impeller carried on a common shaft extending through a turbomachine center housing, said shaft bearing system comprising:

an axially split bearing carrier including a pair of generally cylindrical bearing sleeves mounted within the center housing;

a pair of angular contact ball bearing units each having a complement of bearing balls carried between an inner race ring and an outer race ring, said bearing units being mounted on the shaft and mounted respectively within said bearing sleeves whereby said bearing units rotatably support the shaft relative to said bearing sleeves;

said bearing units being configured to carry thrust loads acting in an axially inboard direction relative to the center housing;

thrust pre-load means comprising a spring member for applying an axially outboard-directed thrust pre-load of predetermined force to said bearing sleeves, said thrust pre-load being transmitted by said bearing sleeves to the associated bearing units mounted therein; and hydraulic means for supplementing said thrust pre-load applied by said spring member;

said split bearing carrier cooperating with said bearing units to define an elongated chamber surrounding the shaft axially between said bearing units, said hydraulic means including at least one flow port for circulating a hydraulic fluid into said chamber;

said at least one flow port being defined cooperatively by slidably interfitted inboard end segments of said bearing sleeves, and at least one oil feed hole formed within one of said bearing sleeves.

2. The shaft bearing system of claim 1 wherein said thrust pre-load means comprises a wave spring engaging and reacting between inboard end segments of said pair of bearing sleeves.

3. The shaft bearing system of claim 1 wherein said bearing sleeves include concentrically overlapping inboard end segments.

4. The shaft bearing system of claim 1 further including a radially outwardly projecting thrust flange on at least one of said bearing sleeves, said thrust flange being positioned axially between a pair of turbocharger housing thrust faces.

5. The shaft bearing system of claim 1 further including means for axially positioning said bearing units generally at predetermined positions along the shaft generally at opposite ends thereof within the center housing.

6. The shaft bearing system of claim 5 wherein said positioning means comprises an elongated bearing spacer carried on the shaft axially between said bearing units, with opposite ends of said bearing spacer engaging the inner race rings of said bearing units.

7. The shaft bearing system of claim 1 wherein said hydraulic fluid comprises lubricating oil.

8. A turbocharger, comprising:

a gas driven turbine wheel and a compressor impeller mounted respectively within a turbine housing and a compressor housing, and carried on a common shaft extending through an intermediate center housing;

an axially split bearing carrier mounted within said center housing and including a pair of generally cylindrical, generally coaxially mounted bearing sleeves;

a pair of angular contact ball bearing units each having a complement of bearing balls carried between an inner race ring and an outer race ring, said bearing units being mounted on said shaft and mounted respectively within said bearing sleeves whereby said bearing units rotatably support the shaft relative to said bearing sleeves, said bearing units being configured to carry thrust loads acting in an axially inboard direction relative to said center housing;

thrust pre-load means including a spring member for applying an axially outboard-directed thrust pre-load of predetermined force to said bearing sleeves, said thrust pre-load being transmitted by said bearing sleeves to the associated bearing units mounted therein; and hydraulic means for supplementing said thrust pre-load applied by said spring member;

said split bearing carrier cooperating with said bearing units to define an elongated chamber surrounding the shaft axially between said bearing units, said hydraulic means including at least one flow port for circulating a hydraulic fluid into said chamber, and at least one oil feed hole formed within one of said bearing sleeves;

said at least one flow port being defined cooperatively by slidably interfitted inboard end segments of said bearing sleeves.

9. The turbocharger of claim 8 wherein said spring member comprises an annular wave spring engaging and reacting between inboard end segments of said pair of bearing sleeves.

10. The turbocharger of claim 8 wherein said bearing sleeves include concentrically overlapping inboard end segments.

11. The turbocharger of claim 8 further including a radially outwardly projecting thrust flange on at least one of said bearing sleeves, said thrust flange being positioned axially between a pair of turbocharger housing thrust faces.

12. The turbocharger of claim 8 further including an elongated bearing spacer carried on said shaft axially between said bearing units, with opposite ends of said bearing spacer engaging the inner race rings of said bearing units.

13. In a rotary machine having a shaft rotatably coupled between a drive source and a driven load, and a pair of angular contact ball bearing units for rotatably supporting said shaft relative to a housing structure, each of said bearing units having a complement of bearing balls carried between inner and outer race rings, and said bearing units being configured to carry thrust loads acting in an axially inboard direction relative to said housing structure, the improvement comprising:

an axially split bearing carrier including a pair of generally cylindrical bearing sleeves mounted within said housing structure, said bearing sleeves having said pair of angular contact ball bearing units respectively mounted therein whereby said bearing units rotatably support the shaft relative to said bearing sleeves;

thrust pre-load means comprising a spring member for applying an axially outboard-directed thrust pre-load of predetermined force to said bearing sleeves, said thrust pre-load being transmitted by said bearing sleeves to the associated bearing units mounted therein; and hydraulic means for supplementing said thrust pre-load applied by said spring member;

said split bearing carrier cooperating with said bearing units to define an elongated chamber surrounding said shaft axially between said bearing units, said hydraulic means including at least one flow port for circulating a hydraulic fluid into said chamber, and at least one oil feed hole formed within one of said bearing sleeves;

said at least one flow port being defined cooperatively by slidably interfitted inboard end segments of said bearing sleeves.

14. The improvement of claim 13 wherein at least one of said drive source and said driven load comprises a turbine.

15. The improvement of claim 13 wherein said thrust pre-load means comprises a wave spring engaging and reacting between inboard end segments of said pair of bearing sleeves.

16. The improvement of claim 13 wherein said bearing sleeves include concentrically overlapping inboard end segments.

17. The improvement of claim 13 further including a radially outwardly projecting thrust flange on at least one of said bearing sleeves, said thrust flange being positioned axially between a pair of thrust faces on said housing structure.

18. The improvement of claim 13 further including an elongated bearing spacer carried on said shaft axially between said bearing units, with opposite ends of said bearing spacer engaging said inner race rings of said bearing units.

* * * * *